United States Patent
Lee et al.

(10) Patent No.: US 9,929,579 B2
(45) Date of Patent: Mar. 27, 2018

(54) METHOD AND APPARATUS FOR CONTROLLING CHARGING OF LOW VOLTAGE BATTERY

(71) Applicant: Hyundai Motor Company, Seoul (KR)

(72) Inventors: Kyu Il Lee, Gyeonggi-do (KR); Ji Tae Kim, Gyeonggi-do (KR); Boung Ho Min, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 265 days.

(21) Appl. No.: 14/709,561

(22) Filed: May 12, 2015

(65) Prior Publication Data
US 2016/0149429 A1   May 26, 2016

(30) Foreign Application Priority Data
Nov. 20, 2014 (KR) .......................... 10-2014-0162568

(51) Int. Cl.
*H02J 7/00* (2006.01)
*B60L 11/18* (2006.01)
*H02J 7/14* (2006.01)

(52) U.S. Cl.
CPC ......... *H02J 7/0057* (2013.01); *B60L 11/1898* (2013.01); *H02J 7/1446* (2013.01); *H02J 2007/0059* (2013.01); *Y02T 10/7005* (2013.01); *Y02T 10/92* (2013.01)

(58) Field of Classification Search
CPC ....................................................... H02J 7/057
USPC .......................................................... 320/101
See application file for complete search history.

(56) References Cited

U.S. PATENT DOCUMENTS

2014/0244082 A1* 8/2014 Caron .................. B60L 11/005
  701/22
2016/0023649 A1* 1/2016 Muller ................ B60W 20/106
  701/22

FOREIGN PATENT DOCUMENTS

| JP | 2007-149621 A | 6/2007 |
| JP | 2010-146922 A | 7/2010 |
| KR | 2012-0052465 A | 5/2012 |
| KR | 10-2014-0016660 A | 2/2014 |
| KR | 10-1459485 B1 | 11/2014 |

* cited by examiner

*Primary Examiner* — Thuan Do
(74) *Attorney, Agent, or Firm* — Mintz Levin Cohn Ferris Glovsky and Popeo, P.C.; Peter F. Corless (57) ABSTRACT

A method and an apparatus for controlling charging of a low voltage battery are provided. The method includes determining a consumption pattern of an auxiliary machinery based on a consumed power of the auxiliary machinery and setting a base charged voltage based on the consumption pattern of the auxiliary machinery. Further, a charged voltage is set for the low voltage battery based on the base charged voltage, a driving mode of a vehicle, and a state of charge of a high voltage battery.

14 Claims, 5 Drawing Sheets

| STATE OF CHARGE | ECONOMY MODE | NORMAL MODE | EXCESSIVE MODE |
|---|---|---|---|
| BASE CHARGED VOLTAGE | FIRST CHARGED VOLTAGE | SECOND CHARGED VOLTAGE | THIRD CHARGED VOLTAGE |

METHOD AND APPARATUS FOR CONTROLLING CHARGING OF LOW VOLTAGE BATTERY

CROSS REFERENCE TO RELATED APPLICATION

The present application claims priority of Korean Patent Application Number 10-2014-0162568 filed on Nov. 20, 2014, the entire contents of which application are incorporated herein for all purposes by this reference.

BACKGROUND

1. Technical Field

The present invention relates to a method and an apparatus for controlling charging of a low voltage battery capable of variably adjusting a charging voltage of the low voltage battery based on a consumed power of an auxiliary machinery, a driving mode of a vehicle, and a state of charge of a high voltage battery.

2. Description of the Related Art

In the related art, a charging voltage of a low voltage battery has been set based on a driving mode of a fuel cell vehicle and a state of charge of a high voltage battery to improve fuel efficiency of the vehicle and stability of a system. Meanwhile, a type of auxiliary machinery using the low voltage battery has increased due to an increase in an electric component of the vehicle. Therefore, powers of the auxiliary machinery have gradually increased.

For example, the powers of the auxiliary machinery are changed based on a speed of a wiper, the turning on and off of a head light, use of an air conditioner or a heater, and use of motor-driven power steering (MDPS). When only a variable voltage control based on a driving mode of the vehicle is performed without considering the power of the auxiliary machinery as described above, discharge of the low voltage battery is continuously generated, potentially causing failures when the vehicle is next started up.

The contents described as the related art have been provided merely for assisting in the understanding for the background of the present invention and should not be considered as corresponding to the related art known to those skilled in the art.

SUMMARY

An object of the present invention provides a method and an apparatus for controlling charging of a low voltage battery capable of preventing a state in which a vehicle may not be started up by determining a consumption pattern of an auxiliary machinery based on a consumed power of the auxiliary machinery and setting a charging voltage of the low voltage battery based on the consumption pattern of the auxiliary machinery.

According to an exemplary embodiment of the present invention, a method for controlling charging of a low voltage battery may include: determining a consumption pattern of an auxiliary machinery based on a consumed power of the auxiliary machinery; setting a base charging voltage based on the consumption pattern of the auxiliary machinery; and setting a charging voltage for the low voltage battery based on the base charging voltage, a driving mode of a vehicle, and a state of charge of a high voltage battery.

The determination of the consumption pattern may include: calculating an average value of the consumed power of the auxiliary machinery measured for a first time; and determining the consumption pattern of the auxiliary machinery based on the average value after the calculating of the average value is performed. The method for controlling charging of a low voltage battery may further include determining whether a measured time exceeds a second time when setting the charging voltage for the low voltage battery. When the measured time exceeds the second time as a result of determining whether the measured time exceeds the second time, the consumption pattern determination of the auxiliary machinery may be repeated.

In the determination of the consumption pattern, the consumption pattern of the auxiliary machinery may be determined based on an entire average consumed power of the auxiliary machinery stored in the previous driving for a preset time when the vehicle is started up. The consumption pattern of the auxiliary machinery may further be determined to be any one of an economy mode, a normal mode, and an excessive mode. The consumption pattern of the auxiliary machinery may be determined to be the economy mode when the average value is less than a first reference value, the normal mode when the average value is greater than the first reference value and is less than a second reference value, and the excessive mode when the average value is greater than the second reference value.

When the consumption pattern of the auxiliary machinery is the normal mode, the base charging voltage may be set to be greater than when the consumption pattern of the auxiliary machinery is the economy mode and when the consumption pattern of the auxiliary machinery is the excessive mode may be set to be greater than when the consumption pattern of the auxiliary machinery is the normal mode.

The method for controlling charging of a low voltage battery may further include, after the setting of the charging voltage for the low voltage battery is performed, determining whether the vehicle is started off; and storing an entire average consumed power of the auxiliary machinery when the vehicle is in a start-off state as a result of determining whether the vehicle is started off. The driving mode may include driving modes including a first driving mode and a second driving mode, a fuel cell stop mode, and an urgency mode, the first driving mode being classified into a plurality of stages based on the state of charge of the high voltage battery. The second driving mode may include a regeneration mode and a power assist mode.

When the driving mode of the vehicle is the first driving mode, the charging voltage for the low voltage battery may be set to the sum of the base charging voltage and an offset charging voltage, the offset charging voltage being set based on the state of charge of the high voltage battery. Additionally, when the driving mode of the vehicle is the fuel cell stop mode, the charging voltage for the low voltage battery may be set to the base charging voltage.

According to another exemplary embodiment of the present invention, an apparatus for controlling charging of a low voltage battery may include: a fuel cell stack used as a main power source and configured to supply a power to a driving system of a vehicle; a high voltage direct current (DC) converter configured to receive the power supplied from the fuel cell stack; a high voltage battery configured to receive a voltage down-converted by the high voltage DC converter; a low voltage DC converter connected to a high voltage bus stage between the fuel cell stack and the high voltage DC converter and configured to convert a voltage; the low voltage battery charged with a low voltage converted by the low voltage DC converter; an auxiliary machinery configured to receive a power from the low voltage battery to thereby be driven; and a controller configured to determine a consumption pattern of the auxiliary machinery based on a consumed power of the auxiliary machinery, set a base charging voltage based on the consumption pattern of the auxiliary machinery, and set a charging voltage for the low voltage battery based on the base charging voltage, a driving mode of the vehicle, and a state of charge of the high voltage battery.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
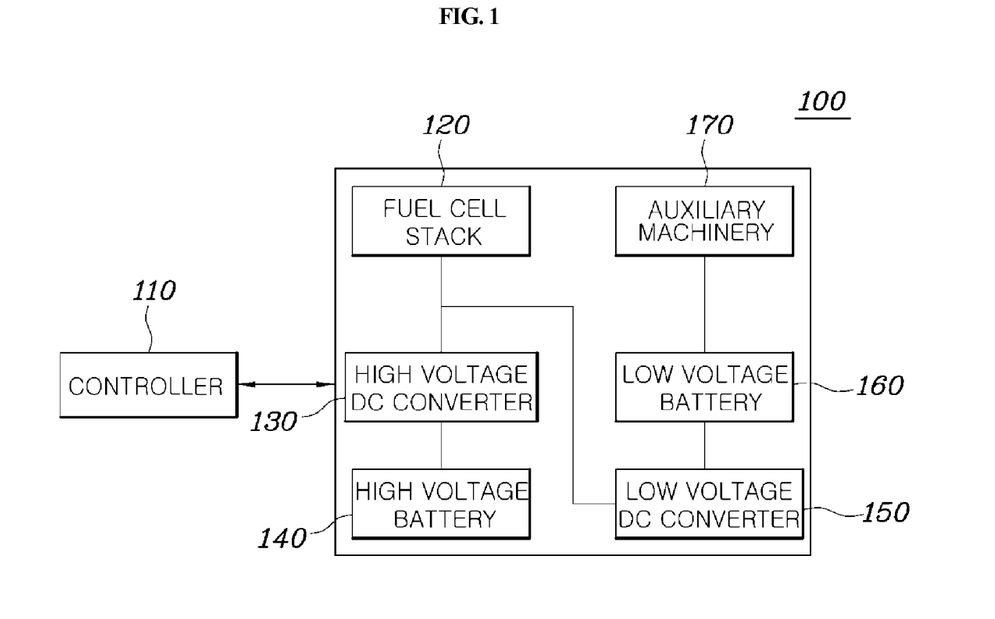
FIG. 1 is an exemplary block diagram showing an apparatus for controlling charging of a low voltage battery according to an exemplary embodiment of the present invention.

Hereinafter, an apparatus for controlling charging of a low voltage battery according to an exemplary embodiment of the present invention will be described with reference to the accompanying drawings. FIG. 1 is an exemplary block diagram showing an apparatus for controlling charging of a low voltage battery according to an exemplary embodiment of the present invention.

Referring to FIG. 1, the apparatus 100 for controlling charging of a low voltage battery may include a fuel cell stack 120 used as a main power source and configured to supply a power to a driving system of a vehicle; a high voltage direct current (DC) converter configured to receive the power supplied from the fuel cell stack 120; a high voltage battery 140 configured to receive a voltage down-converted by the high voltage DC converter 130; a low voltage DC converter 150 connected to a high voltage bus stage between the fuel cell stack 120 and the high voltage DC converter 130 and configured to convert a voltage; the low voltage battery 160 charged with a low voltage converted by the low voltage DC converter 150; an auxiliary machinery 170 configured to receive a power from the low voltage battery 160 to thereby be driven; and a controller 110 configured to determine a consumption pattern of the auxiliary machinery 170 based on a consumed power of the auxiliary machinery 170, set a base charging voltage based on the consumption pattern of the auxiliary machinery 170, and set a charging voltage for the low voltage battery 160 based on the base charging voltage, a driving mode of the vehicle, and a state of charge of the high voltage battery 140.

Figure 2:
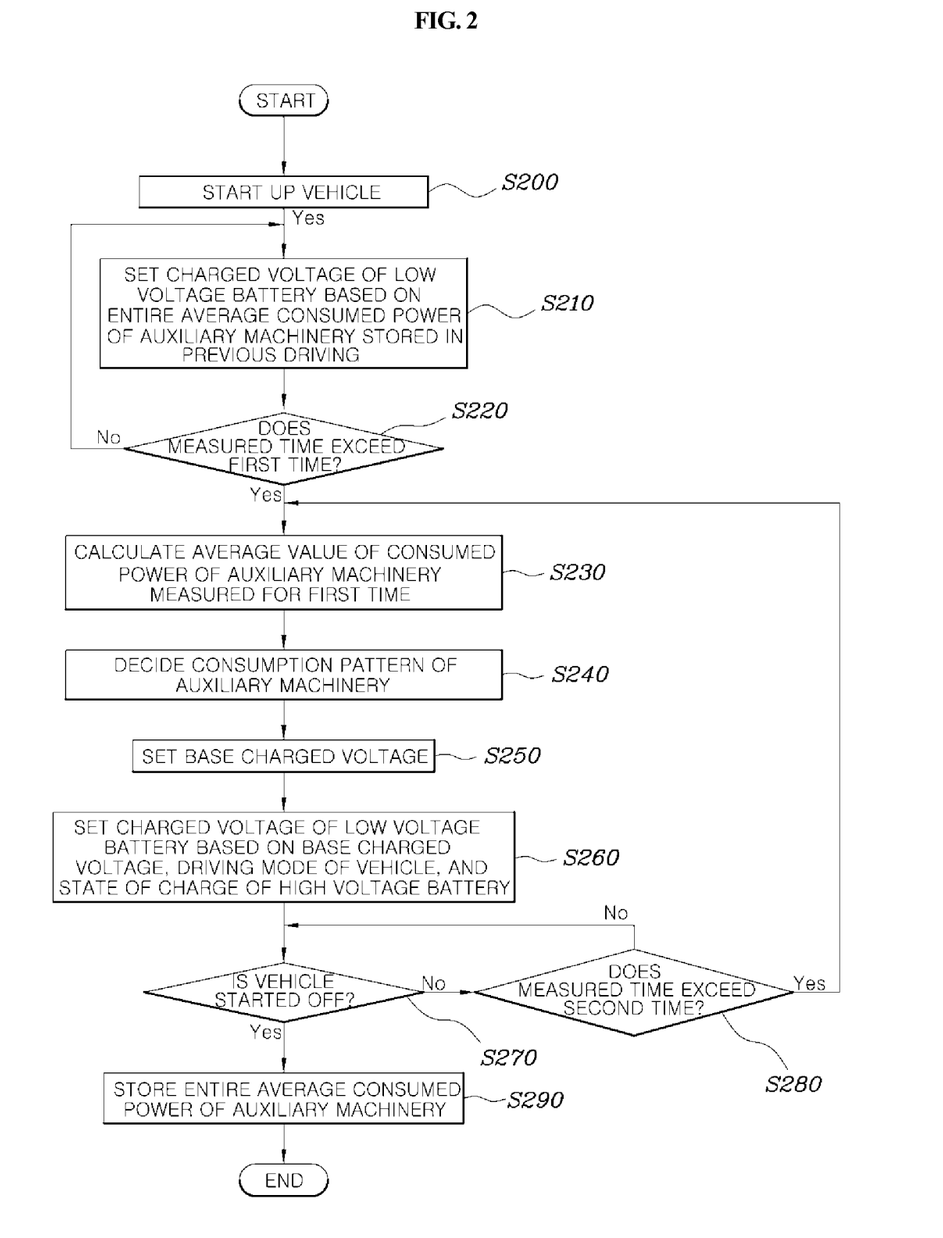
FIG. 2 is an exemplary flow chart showing a method for controlling charging of a low voltage battery according to an exemplary embodiment of the present invention.
Figure 3:
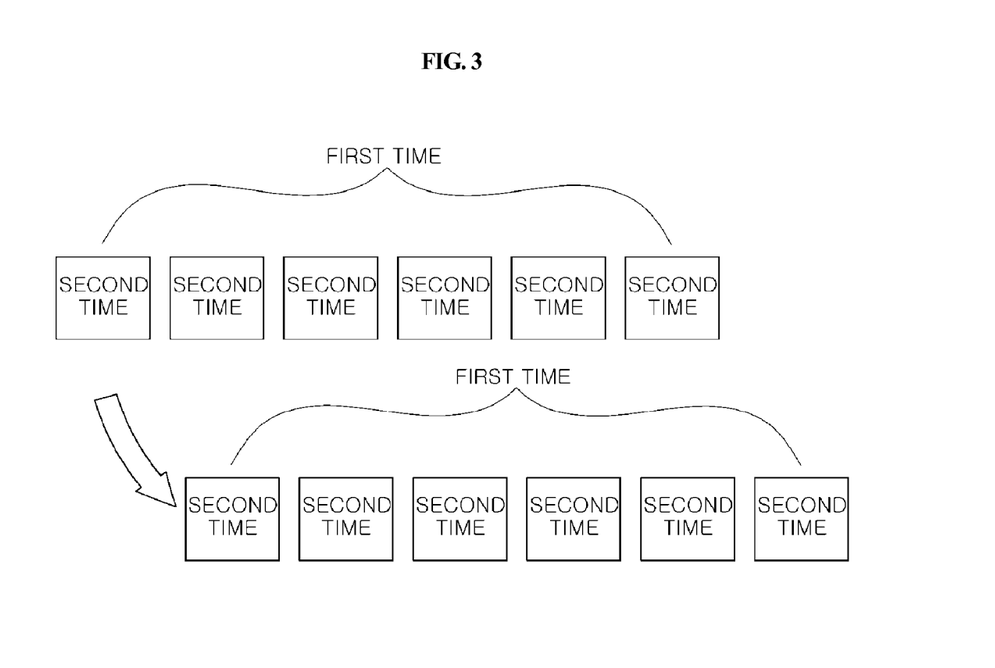
FIG. 3 is an exemplary view showing a scheme of updating an average value of a consumed power of an auxiliary machinery for a first time in the method for controlling charging of a low voltage battery according to an exemplary embodiment of the present invention.
Figure 4:
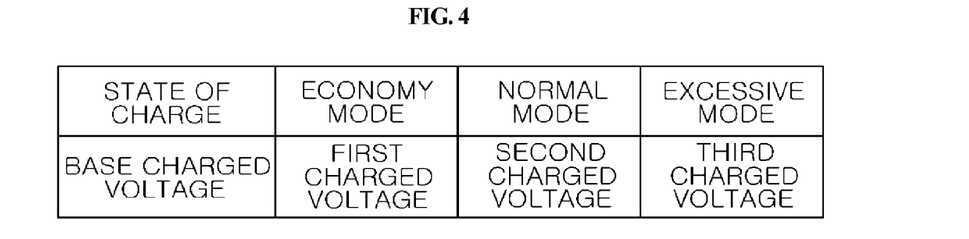
FIG. 4 is an exemplary table showing an example of base charging voltages for each consumption pattern of an auxiliary machinery according to an exemplary embodiment of the present invention.
Figure 5:
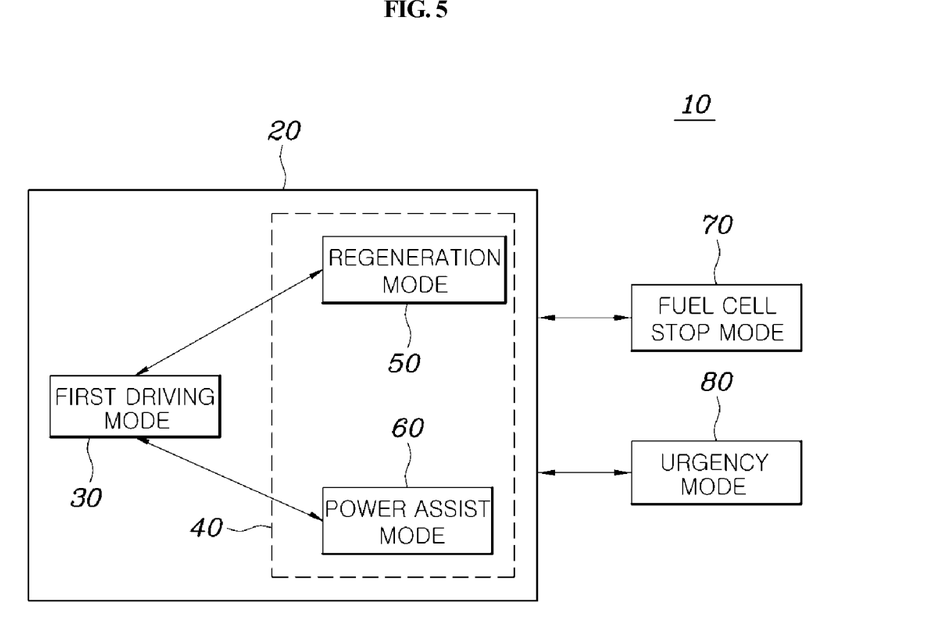
FIG. 5 is an exemplary block diagram showing driving modes of the method for controlling charging of a low voltage battery according to an exemplary embodiment of the present invention.
Figure 6:
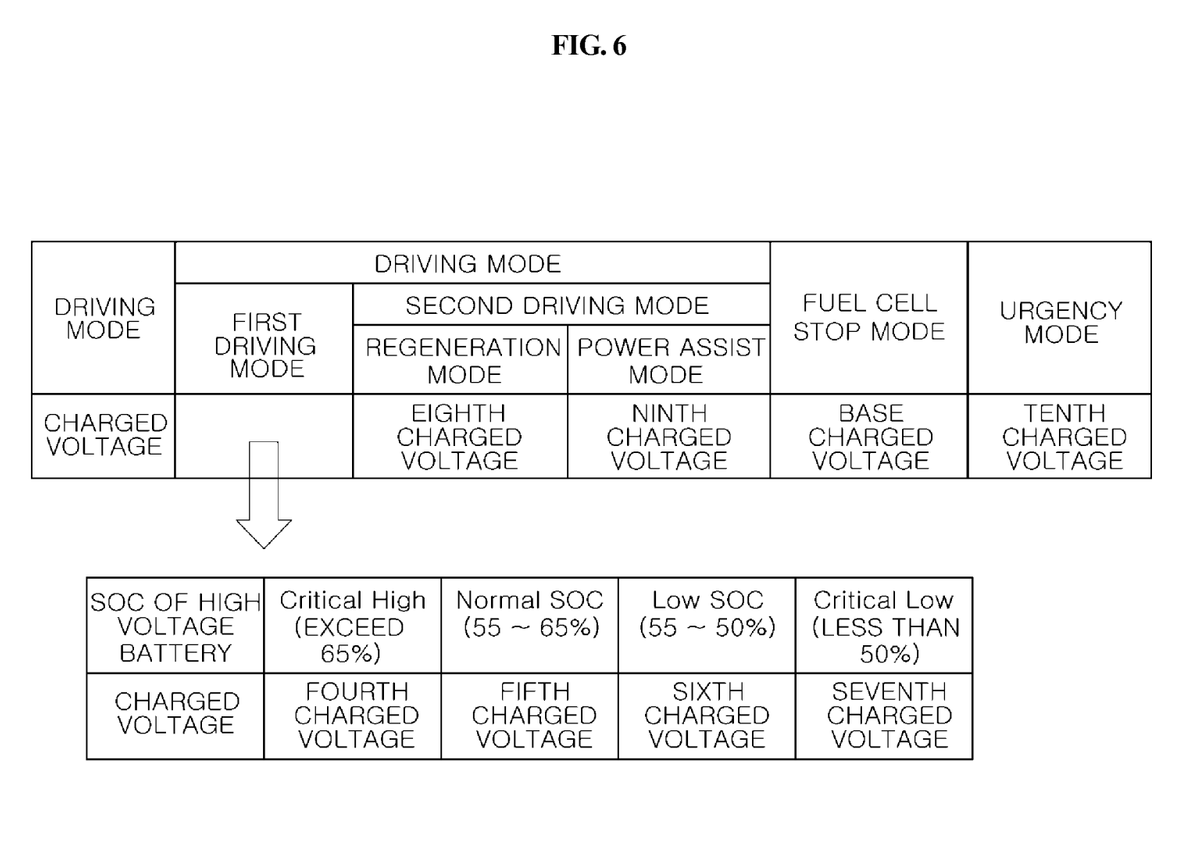
FIG. 6 is an exemplary table showing an example of charging voltages of a low voltage battery for each driving mode according to an exemplary embodiment of the present invention.

Hereinafter, a method for controlling charging of a low voltage battery according to an exemplary embodiment of the present invention will be described with reference to the accompanying drawings. FIG. 2 is an exemplary flow chart showing a method for controlling charging of a low voltage battery according to an exemplary embodiment of the present invention. FIG. 3 is an exemplary view showing a scheme of updating an average value of a consumed power of an auxiliary machinery for a first time in the method for controlling charging of a low voltage battery according to an exemplary embodiment of the present invention. FIG. 4 is an exemplary table showing an example of base charging voltages for each consumption pattern of an auxiliary machinery according to an exemplary embodiment of the present invention. FIG. 5 is an exemplary block diagram showing driving modes of the method for controlling charging of a low voltage battery according to an exemplary embodiment of the present invention. FIG. 6 is an exemplary table showing an example of charging voltages of a low voltage battery for each driving mode according to an exemplary embodiment of the present invention.

Referring to FIGS. 2 to 6, the method for controlling charging of a low voltage battery may include determining a consumption pattern of an auxiliary machinery based on a consumed power of the auxiliary machinery; setting a base charging voltage based on the consumption pattern of the auxiliary machinery (S250); and setting a charging voltage for the low voltage battery based on the base charging voltage, a driving mode of a vehicle, and a state of charge of a high voltage battery (S260).

The determination of the consumption pattern may include calculating an average value of the consumed power of the auxiliary machinery measured for a first time (S230); and determining the consumption pattern of the auxiliary machinery based on the average value (S240) after the average value (S230) is calculated, and in the determination of the consumption pattern, the consumption pattern of the auxiliary machinery may be determined based on an entire average consumed power of the auxiliary machinery stored in the previous driving for a preset time (S210) when the vehicle is started up (S200).

The auxiliary machinery may include apparatuses configured to receive a power from the low voltage battery to be driven. When a driving amount of the auxiliary machineries is increased, a power amount output to the auxiliary machineries by the low voltage battery is increased. In other words, the consumed power of the auxiliary machinery rises. Particularly, when a variable voltage control based on the driving mode of the vehicle is performed in a state in which the consumed power of the auxiliary machinery excessively increases, discharge of the low voltage battery may be continuously generated, thus preventing the vehicle from being started up during a next start up. Therefore, in the present invention, the charging voltage for the low voltage battery may be set based on the consumed power of the auxiliary machinery, thereby making it possible to prevent the discharge of the low voltage battery.

In the present invention, when the vehicle is started up (S200), the consumption pattern of the auxiliary machinery may be determined based on the entire average consumed power of the auxiliary machinery stored in the previous driving (e.g., when the vehicle was previously driven), and the charging voltage for the low voltage battery may be set based on the consumption pattern of the corresponding auxiliary machinery (S210). In particular, the consumed power of the auxiliary machinery may not be determined for the first time during the start-up of the vehicle, and when a measured time exceeds the first time (S220), the average value of the consumed power of the auxiliary machinery measured for the first time may be calculated (S230). When the measured time does not exceed the first time (S220), the charging voltage for the low voltage battery may be continuously set based on the entire average consumed power of the auxiliary machinery stored in the previous driving (S210). Therefore, even though the vehicle is started up, a setting control may be performed on the charging voltage for the low voltage battery based on the consumption pattern of the auxiliary machinery.

The method for controlling charging of a low voltage battery may further include determining whether a measured time exceeds a second time (S280) during the setting of the charging voltage for the low voltage battery (S260). When the measured time exceeds the second time as a result of determining of whether the measured time exceeds the second time (S280), the determination of the consumption pattern of the auxiliary machinery (S240) may be repeated. In particular, the second time may be shorter than the first time.

In other words, as shown in an upper portion of FIG. 3, a consumed power of the auxiliary machinery may be measured for the first time (e.g., a first measurement), and may be separately measured for the second time (e.g., a second measurement). When the setting of the charging voltage for the low voltage battery is complete, as shown in a low portion of FIG. 3, a consumed power of the auxiliary machinery may be measured for a new second time and may be updated accordingly, and data of a consumed power of the auxiliary machinery measured for an initial second time may be deleted to calculate the average value of the consumed power of the auxiliary machinery for the first time. Therefore, the consumed power of the auxiliary machinery may be determined in real time, thereby making it possible to more accurately set the charging voltage of the low voltage battery.

In addition, as shown in FIG. 4, the consumption pattern of the auxiliary machinery may be determined to be any one of an economy mode, a normal mode, and an excessive mode. Particularly, the consumption pattern of the auxiliary machinery may be determined to be the economy mode when the average value is less than a first reference value, may be determined to be the normal mode when the average value is greater than the first reference value and is smaller less a second reference value, and may be determined to be the excessive mode when the average value is greater than the second reference value (S240).

The base charging voltage may be set to a first charging voltage when the consumption pattern of the auxiliary machinery is the economy mode, may be set to a second charging voltage when the consumption pattern of the auxiliary machinery is the normal mode, and may be set to a third charging voltage when the consumption pattern of the auxiliary machinery is the excessive mode. In particular, the first charging voltage may be less than the second charging voltage and the third charging voltage. The second charging voltage may be greater than the first charging voltage and be less than the third charging voltage. The third charging voltage may be greater than the first charging voltage and the second charging voltage.

In response to determining that the average value of the power consumed by the auxiliary machinery is excessively high (e.g., greater than a predetermined average value), since there may be a risk that the low voltage battery will be discharged, the base charging voltage may be set to be high (e.g., greater than a predetermined base charging voltage), thereby making it possible to set the charging voltage for the low voltage battery to be high. Further, in response to determining that the average value of the power consumed by the auxiliary machinery is excessively low, since the risk that the low voltage battery will be discharged is minimal, the base charging voltage may be set to be low, thereby making it possible to control the charging voltage for the low voltage battery to be relatively low. Therefore, a phenomenon that the low voltage battery is discharged or a phenomenon that the low voltage battery is excessively charged may be prevented. Meanwhile, the excessively high average value may be 1200 W, and the excessively low average value may be 600 W. The high base charging voltage may be 14V, and the low base charging voltage may be 12V.

The method for controlling charging of a low voltage battery according to an exemplary embodiment of the present invention may further include, after setting the charging voltage for the low voltage battery (S260), determining whether the vehicle is started off (S270); and storing the entire average consumed power of the auxiliary machinery (S280) when the vehicle is in a start-off state as a result of determining whether the vehicle is started off (S270). The entire average consumed power of the auxiliary machinery may be stored before the vehicle is started off, thereby making it possible to set the charging voltage for the low voltage battery based on the entire average consumed power of the auxiliary machinery during the next start-up of the vehicle.

Meanwhile, as shown in FIG. 5, the driving mode 10 according to an exemplary embodiment of the present invention may include driving modes 20 that include a first driving mode 30 and a second driving mode 40, a fuel cell stop mode 70, and an urgency mode 80. The first driving mode 30 may be classified into a plurality of stages based on the state of charge of the high voltage battery and the second driving mode 40 may include a regeneration mode 50 and a power assist mode 60. The controller may be configured to determine the current driving mode of the vehicle and adjust the charging of the low voltage battery based on charging voltages preset in each mode.

The first driving mode 30 may be classified into the plurality of stages based on the state of charge (SOC) of the high voltage battery. Further, the first driving mode 30 may indicate a general driving mode and a driving mode except for the second driving mode 40 including the regeneration mode 50 and the power assist mode 60 among the driving modes 20 indicating when the vehicle is being driven. The plurality of stages may include, for example, four stages classified based on the state of charge (SOC) of the high voltage battery, wherein the four stages may include a normal stage that corresponds to when the SOC of the high voltage battery is about 55% to 65%, a critical high stage that corresponds to when the SOC of the high voltage battery is greater than about 65%, a critical low stage that corresponds to when the SOC of the high voltage battery is less than about 50%, and a low stage that corresponds to when the SOC of the high voltage battery is about 50% to 55%.

The regeneration mode 50 of the second driving mode 40 is a mode of recovering regeneration brake energy from a motor. In particular, in the regeneration mode, kinetic energy of the vehicle may be converted into electric energy through power generation of the motor when speed of the vehicle is decreased or the deceleration pedal is engaged to charge the high voltage battery. When the deceleration pedal is engaged (e.g., pressure is applied to the brake pedal), the driving mode of the vehicle may be switched from the first driving mode 30 to recover the regeneration brake energy from the motor. In addition, when the accelerator pedal is engaged to drive the vehicle when the vehicle is in the regeneration mode 50, the driving mode of the vehicle may be switched back to the first driving mode 30.

The power assist mode 60 may simultaneously use power of a fuel cell and power of the high voltage battery and is a driving mode in which the accelerator pedal may be engaged at a preset depth or greater or the power of the fuel cell may reach a preset power. When the accelerator pedal is engaged to the preset depth or greater or the power of the fuel cell reaches the preset power when the vehicle is being driven in the first driving mode 30, the driving mode of the vehicle may be switched to the power assist mode 60, and may also be reversely switched.

The fuel cell stop mode 70 indicates a section in which the vehicle is driven by the high voltage battery by stopping the fuel cell in a low power section or a section in which a speed is low (e.g., less than a predetermined speed). When the vehicle is being driven in the low power section, a voltage of the fuel cell may increase, which may have a negative effect on durability of the fuel cell. Therefore, in the low power section, the fuel cell may be stopped. Generally, the driving mode of the vehicle may be switched to the regeneration mode 50 when a speed of the vehicle is decreased to brake the vehicle in the first driving mode 30, may be switched to the fuel cell stop mode 70 when the vehicle is completely stopped, and my be switched to the first driving mode 30 by again driving the fuel cell when a speed or a power of the vehicle exceeds a predetermined speed or power.

The urgency mode 80 indicates an emergency mode in which the vehicle is driven by the high voltage battery when a fault or failure occurs in a fuel cell system. Generally, in the urgency mode 80, the fuel cell is not re-driven until the vehicle is started off. However, when hydrogen is leaked or a fault occurs in the fuel cell, an attempt to re-drive the fuel cell may be performed, such that the driving mode of the vehicle may be shifted to the first driving mode 30, and the urgency mode 80 may be maintained until a key is turned off when the re-driving fails.

In the present invention, as shown in FIG. 6, the charging voltage for the low voltage battery may be set based on the consumption pattern of the auxiliary machinery, the driving mode of the vehicle, and the state of charge of the high voltage battery. When the driving mode of the vehicle is the first driving mode 30, the charging voltage for the low voltage battery may be set to the sum of the base charging voltage and an offset charging voltage, wherein the offset charging voltage may be set based on the state of charge of the high voltage battery. In addition, when the driving mode of the vehicle is the fuel cell stop mode 70, the charging voltage for the low voltage battery may be set to the base charging voltage.

For example, when the driving mode of the vehicle is the first driving mode 30, the low voltage battery may be charged with a fourth charging voltage when the SOC of the high voltage battery is the critical high stage, may be charged with a fifth charging voltage when the SOC of the high voltage battery is the normal stage, may be charged with a sixth charging voltage when the SOC of the high voltage battery is the low stage, and may be charged with a seventh charging voltage when the SOC of the high voltage battery is the critical low stage, based on the plurality of stages classified depending on the SOC of the high voltage battery. The fourth charging voltage may be greater than the fifth charging voltage, the sixth charging voltage, and the seventh charging voltage. The fifth charging voltage may be less than the fourth charging voltage and greater than the sixth charging voltage and the seventh charging voltage. The sixth charging voltage may be less than the fourth charging voltage and the fifth charging voltage and greater than the seventh charging voltage. The seventh charging voltage may be less than the fourth charging voltage, the fifth charging voltage, and the sixth charging voltage. In other words, as the SOC of the high voltage battery increases, the offset charging voltage may be set to increase.

In addition, when the driving mode of the vehicle is the regeneration mode 50 of the second driving mode 40, the charging voltage for the low voltage battery may be set to an eighth charging voltage, and when the driving mode of the vehicle is the power assist mode 60 of the second driving mode 40, the charging voltage for the low voltage battery may be set to a ninth charging voltage. For example, when the vehicle is in the fuel cell stop mode 70, the charging voltage for the low voltage battery may be set to the base charging voltage, and when the vehicle is in the urgency mode 80, the charging voltage for the low voltage battery may be set to a tenth charging voltage.

Generally, the vehicle passes through the regeneration mode 50 and then enters the fuel cell stop mode 70. The eighth charging voltage may be greater than the third charging voltage, which is the base charging voltage. The ninth charging voltage and the tenth charging voltage may be greater than the first charging voltage of the base charging voltage and less than the third charging voltage. In other words, the charging voltages for charging the low voltage battery may be set to be different based on the base charging voltage, the driving mode of the vehicle, and the SOC of the high voltage battery, thereby making it possible to improve fuel efficiency of fuel cell and hybrid vehicles and prevent the phenomenon that the low voltage battery is discharged and excessively charged.

However, numerical values of the charging voltages set as described above and numerical values indicating degrees of the SOC of the high voltage battery classifying the stages are merely examples, and are not limited thereto, but may be variously set according to various exemplary embodiments.

With the method and the apparatus for controlling charging of a low voltage battery configured in the structure as described above, the charging voltage of the low voltage battery may be set based on the consumed power of the auxiliary machinery to prevent the phenomenon that the low voltage battery is discharged and excessively charged, thereby making it possible to improve a start-up property. In addition, the charging voltage of the low voltage battery may be varied based on the consumed power of the auxiliary machinery and the driving mode of the vehicle, thereby making it possible to improve fuel efficiency.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A method for controlling charging of a low voltage battery, comprising:
    determining, by a controller, a consumption pattern of an auxiliary machinery based on a consumed power of the auxiliary machinery;
    setting, by the controller, a base charging voltage based on the consumption pattern of the auxiliary machinery;
    setting, by the controller, a charging voltage for the low voltage battery based on the base charging voltage, a driving mode of a vehicle, and a state of charge of a high voltage battery; and
    controlling, by the controller, a low voltage direct current (DC) converter to charge the low voltage battery with the charging voltage,
    wherein the driving mode includes a plurality of driving modes including: a first driving mode and a second driving mode, a fuel cell stop mode, and an urgency mode, the first driving mode being classified into a plurality of stages based on the state of charge of the high voltage battery.

2. The method for controlling charging of a low voltage battery of claim 1, wherein the determination of the consumption pattern includes:
    calculating, by the controller, an average value of the consumed power of the auxiliary machinery measured for a first time; and
    determining, by the controller, the consumption pattern of the auxiliary machinery based on the average value after calculating the average value.

3. The method for controlling charging of a low voltage battery of claim 2, further comprising:
    determining, by the controller, whether a measured time exceeds a second time while setting the charging voltage for the low voltage battery,
    wherein when the measured time exceeds the second time, the determination of the consumption pattern of the auxiliary machinery is repeated.

4. The method for controlling charging of a low voltage battery of claim 2, wherein the consumption pattern of the auxiliary machinery is determined to be any one of the group consisting of: an economy mode, a normal mode, and an excessive mode.

5. The method for controlling charging of a low voltage battery of claim 4, wherein the consumption pattern of the auxiliary machinery is determined to be the economy mode when the average value is less than a first reference value, is determined to be the normal mode when the average value is greater than the first reference value and is less than a second reference value, and is determined to be the excessive mode when the average value is greater than the second reference value.

6. The method for controlling charging of a low voltage battery of claim 4, further comprising:
    setting, by the controller, the base charging voltage to be greater than when the consumption pattern of the auxiliary machinery is the economy mode, when the consumption pattern of the auxiliary machinery is the normal mode; and
    setting, by the controller, the base charging voltage to be greater than when the consumption pattern of the auxiliary machinery is the normal mode, when the consumption pattern of the auxiliary machinery is the excessive mode.

7. The method for controlling charging of a low voltage battery of claim 1, wherein in the determination of the consumption pattern, the consumption pattern of the auxiliary machinery is determined based on an entire average consumed power of the auxiliary machinery stored in the previous driving for a preset time when the vehicle is started up.

8. The method for controlling charging of a low voltage battery of claim 1, further comprising:
    after setting the charging voltage for the low voltage battery, determining, by the controller, whether the vehicle is started off; and
    storing, by the controller, an entire average consumed power of the auxiliary machinery when the vehicle is in a start-off state in response to determining whether the vehicle is started off.

9. The method for controlling charging of a low voltage battery of claim 1, wherein the second driving mode includes a regeneration mode and a power assist mode.

10. The method for controlling charging of a low voltage battery of claim 1, wherein when the driving mode of the vehicle is the first driving mode, the charging voltage for the low voltage battery is set to the sum of the base charging voltage and an offset charging voltage, the offset charging voltage being set based on the state of charge of the high voltage battery.

11. The method for controlling charging of a low voltage battery of claim 1, wherein when the driving mode of the vehicle is the fuel cell stop mode, the charging voltage for the low voltage battery is set to the base charging voltage.

12. An apparatus for controlling charging of a low voltage battery, comprising:
   a fuel cell stack used as a main power source and configured to supply a power to a driving system of a vehicle;
   a high voltage direct current (DC) converter configured to receive the power supplied from the fuel cell stack;
   a high voltage battery configured to receive a voltage down-converted by the high voltage DC converter;
   a low voltage DC converter connected to a high voltage bus stage between the fuel cell stack and the high voltage DC converter and configured to receive a voltage;
   the low voltage battery charged with a low voltage converted by the low voltage DC converter;
   an auxiliary machinery configured to receive a power from the low voltage battery to be driven; and
   a controller configured to:
      determine a consumption pattern of the auxiliary machinery based on a consumed power of the auxiliary machinery;
      set a base charging voltage based on the consumption pattern of the auxiliary machinery;
      set a charging voltage for the low voltage battery based on the base charging voltage, a driving mode of the vehicle, and a state of charge of the high voltage battery; and
      control a low voltage DC converter to charge the low voltage battery with the charging voltage,
      wherein the driving mode includes a plurality of driving modes including: a first driving mode and a second driving mode, a fuel cell stop mode, and an urgency mode, the first driving mode being classified into a plurality of stages based on the state of charge of the high voltage battery.

13. The apparatus for controlling charging of a low voltage battery of claim 12, wherein for the determination of the consumption pattern the controller is further configured to:
   calculate an average value of the consumed power of the auxiliary machinery measured for a first time; and
   determine the consumption pattern of the auxiliary machinery based on the average value after calculating the average value.

14. The apparatus for controlling charging of a low voltage battery of claim 13, wherein the controller is further configured to:
   determine whether a measured time exceeds a second time while setting the charging voltage for the low voltage battery,
repeat the determination of the consumption pattern of the auxiliary machinery when the measured time exceeds the second time.

* * * * *